(12) United States Patent
Kobayashi et al.

(10) Patent No.: US 8,528,257 B2
(45) Date of Patent: Sep. 10, 2013

(54) CONVERTIBLE PET BARRIER WITH A CONNECTION MEMBER

(75) Inventors: Terutoki Kobayashi, Toyama (JP); Shingi Otani, Toyama (JP)

(73) Assignee: Richell Corporation, Toyama-ken (JP)

( * ) Notice: Subject to any disclaimer, the term of this patent is extended or adjusted under 35 U.S.C. 154(b) by 105 days.

(21) Appl. No.: 13/041,184

(22) Filed: Mar. 4, 2011

(65) Prior Publication Data
US 2012/0223283 A1 Sep. 6, 2012

(51) Int. Cl.
*E06B 3/32* (2006.01)

(52) U.S. Cl.
USPC .......................................................... 49/463

(58) Field of Classification Search
USPC ................... 49/55, 57, 50, 463, 465; 16/365, 16/366; 256/24–21, 73, 24–31; 403/168
See application file for complete search history.

(56) References Cited

U.S. PATENT DOCUMENTS

| | | |
|---|---|---|
| 1,170,794 A | 2/1916 | Barnes |
| 1,799,308 A | 4/1931 | Matthiesen et al. |
| 2,610,830 A | 9/1952 | George |
| 2,736,041 A | 2/1956 | Maloof |
| 3,002,493 A | 10/1961 | Galamba |
| 3,204,606 A | 9/1965 | Parr et al. |
| 4,062,322 A | 12/1977 | Dormehl |
| 4,073,478 A | 2/1978 | Bermudez |
| 4,645,183 A | 2/1987 | Rattray et al. |
| 4,777,765 A | 10/1988 | Johnson, Jr. |
| 5,042,198 A * | 8/1991 | Privratsky ....................... 49/248 |
| 5,058,863 A | 10/1991 | Maffet |
| 5,081,723 A | 1/1992 | Saunders |
| 5,117,585 A | 6/1992 | Andrisin, III |
| 5,170,746 A | 12/1992 | Roose |
| 5,282,606 A | 2/1994 | Praiss |
| 5,402,988 A | 4/1995 | Eisele |
| 5,544,870 A | 8/1996 | Kelley et al. |
| 5,782,039 A | 7/1998 | Scherer et al. |
| 5,881,789 A * | 3/1999 | Melashenko et al. ......... 160/135 |
| 5,927,694 A | 7/1999 | Montepiano |
| 5,967,089 A | 10/1999 | Allen |
| 5,993,103 A | 11/1999 | Christensen |
| 6,027,104 A | 2/2000 | Alexander et al. |
| 6,112,461 A | 9/2000 | Cheng |

(Continued)

FOREIGN PATENT DOCUMENTS

| | | |
|---|---|---|
| EP | 1842986 A1 * | 10/2007 |
| JP | 48-29652 | 9/1973 |

(Continued)

OTHER PUBLICATIONS

Office Action dated May 30, 2008, U.S. Appl. No. 11/280,790.

(Continued)

*Primary Examiner* — Katherine Mitchell
*Assistant Examiner* — Scott Denion

(57) ABSTRACT

In an embodiment of the disclosure, a pet barrier connection member is disclosed. The pet barrier connection member comprises a first end configured to couple to a top surface of a first panel and a top surface of a second panel, a second end configured to couple to a bottom surface of the first panel and a bottom surface of the second panel, and a rod coupled to the first end and the second end.

4 Claims, 9 Drawing Sheets

(56) References Cited

U.S. PATENT DOCUMENTS

| | | | | |
|---|---|---|---|---|
| 6,123,321 | A | * | 9/2000 | Miller .............................. 256/25 |
| 6,161,334 | A | | 12/2000 | Goodin |
| 6,190,082 | B1 | * | 2/2001 | Butterfield .................... 403/325 |
| 6,408,486 | B1 | * | 6/2002 | Saliba et al. .................... 16/382 |
| 6,540,209 | B2 | * | 4/2003 | Ross .............................. 256/68 |
| 6,553,940 | B1 | | 4/2003 | Powell et al. |
| 6,581,914 | B2 | | 6/2003 | Saura Sotillos et al. |
| 6,595,498 | B1 | * | 7/2003 | Andersen ........................ 256/67 |
| 6,681,523 | B1 | | 1/2004 | Stener |
| 6,854,426 | B2 | | 2/2005 | Campbell et al. |
| 6,945,518 | B1 | | 9/2005 | Chrysler |
| 7,234,275 | B1 | | 6/2007 | Haggy et al. |
| D579,609 | S | | 10/2008 | Hirokawa et al. |
| 7,568,449 | B2 | | 8/2009 | Hirokawa et al. |
| 7,739,983 | B2 | | 6/2010 | Hirokawa et al. |
| 7,954,456 | B2 | | 6/2011 | Hirokawa et al. |
| 2001/0011406 | A1 | | 8/2001 | Nakamoto et al. |
| 2003/0197164 | A1 | | 10/2003 | Monahan et al. |
| 2003/0209208 | A1 | | 11/2003 | Campbell et al. |
| 2004/0188667 | A1 | | 9/2004 | Ray et al. |
| 2004/0206947 | A1 | | 10/2004 | Rosaen |
| 2004/0206948 | A1 | | 10/2004 | Lappen |
| 2006/0174563 | A1 | * | 8/2006 | Fumagalli ....................... 52/239 |
| 2008/0011994 | A1 | | 1/2008 | Howe et al. |
| 2008/0141450 | A1 | | 6/2008 | Pesta |
| 2008/0185566 | A1 | * | 8/2008 | Flannery ......................... 256/73 |
| 2008/0236502 | A1 | | 10/2008 | Elias et al. |
| 2012/0112148 | A1 | * | 5/2012 | Hammond ...................... 256/19 |

FOREIGN PATENT DOCUMENTS

| | | |
|---|---|---|
| JP | 54-98754 | 7/1979 |
| JP | 1991-3237 | 1/1991 |
| JP | 1991-48555 | 5/1991 |
| JP | 929649 | 7/1995 |
| JP | 07173891 | 7/1995 |
| JP | 07285775 | 10/1995 |
| JP | 1087801 | 10/2000 |
| JP | 1087802 | 10/2000 |
| JP | 1087937 | 10/2000 |
| JP | 3076305 | 1/2001 |
| JP | 2001008604 | 1/2001 |
| JP | 3078066 | 3/2001 |
| JP | 1122773 | 10/2001 |
| JP | 2002021376 | 1/2002 |
| JP | 1137270 | 3/2002 |
| JP | 2002088953 | 3/2002 |
| JP | 2002302355 | 10/2002 |
| JP | 1169549 | 4/2003 |
| JP | 1169773 | 4/2003 |
| JP | 1170082 | 4/2003 |
| JP | 1174314 | 6/2003 |
| JP | 3467626 | 9/2003 |
| JP | 2004242649 | 9/2004 |
| JP | 2004324333 | 11/2004 |
| JP | 3821299 | 6/2006 |
| JP | 4007515 | 9/2007 |
| JP | 4197510 | 10/2008 |
| JP | 4212001 | 11/2008 |
| JP | 4873477 | 2/2012 |

OTHER PUBLICATIONS

Notice of Allowance dated Nov. 18, 2008, U.S. Appl. No. 11/280,790.
Supplemental Notice of Allowance dated Jun. 10, 2009, U.S. Appl. No. 11/280,790.
Office Action dated Sep. 23, 2009, U.S. Appl. No. 12/367,402.
Notice of Allowance dated Feb. 23, 2010, U.S. Appl. No. 12/367,402.
Office Action dated Sep. 2, 2010, U.S. Appl. No. 12/786,422.
Notice of Allowance dated Jan. 31, 2011, U.S. Appl. No. 12/786,422.
Office Action dated Jun. 22, 2010, U.S. Appl. No. 11/938,780.
Final Office Action dated Dec. 6, 2010, U.S. Appl. No. 11/938,780.
Office Action dated Oct. 17, 2011, U.S. Appl. No. 13/097,603.
Notice of Allowance dated Apr. 2, 2012, U.S. Appl. No. 13/097,603.
Amendments dated Nov. 13, 2007, Application No. JP2004-338416.
Petition dated Nov. 13, 2007, Application No. JP2004-338416.
Amendments dated Jun. 30, 2008, Application No. JP2004-338416.
Notification of Office Action dated Aug. 19, 2008, Application No. JP2004-338416.
Amendments dated Aug. 29, 2008, Application No. JP2004-338416.
Response to Office Action dated Aug. 29, 2008, Application No. JP2004-338416.
Amendments dated May 17, 2006, Application No. JP2006-122774.
Detailed Explanations in regard to Accelerated Examination dated May 17, 2006, Application No. JP2006-122774.
Amendments dated Aug. 1, 2007, Application No. JP2007-200385.
Detailed Explanations in regard to Accelerated Examination dated Aug. 1, 2007, Application No. JP2007-200385.
Amendments dated Jun. 30, 2008, Application No. JP2008-169750.
Detailed Explanations in regard to Accelerated Examination dated Jun. 30, 2008, Application No. JP2008-169750.
Notification of Office Action dated Aug. 18, 2008, Application No. JP2008-169750.
Amendments dated Sep. 29, 2008, Application No. JP2008-169750.
Response to Office Action dated Sep. 29, 2008, Application No. JP2008-169750.
Notification of Office Action dated Jan. 20, 2011, Application No. JP2006-307203.
Response to Office Action dated Mar. 22, 2011, Application No. JP2006-307203.
Amendments dated Mar. 22, 2011, Application No. JP2006-307203.
Kobayashi, Terutoki, et al., Patent application entitled "Pet Barrier", filed Nov. 12, 2007 as U.S. Appl. No. 11/938,780.
Kaneda, Daisuke, et al., Patent application entitled "Pet Barrier with Adjustable Hinges", filed Sep. 7, 2012 as U.S. Appl. No. 13/606,015.
Richell Corporation, Pet Sitter Gate Picture Taken From Sales Catalog, 2003-2004, Issued in Feb. 2003.

* cited by examiner

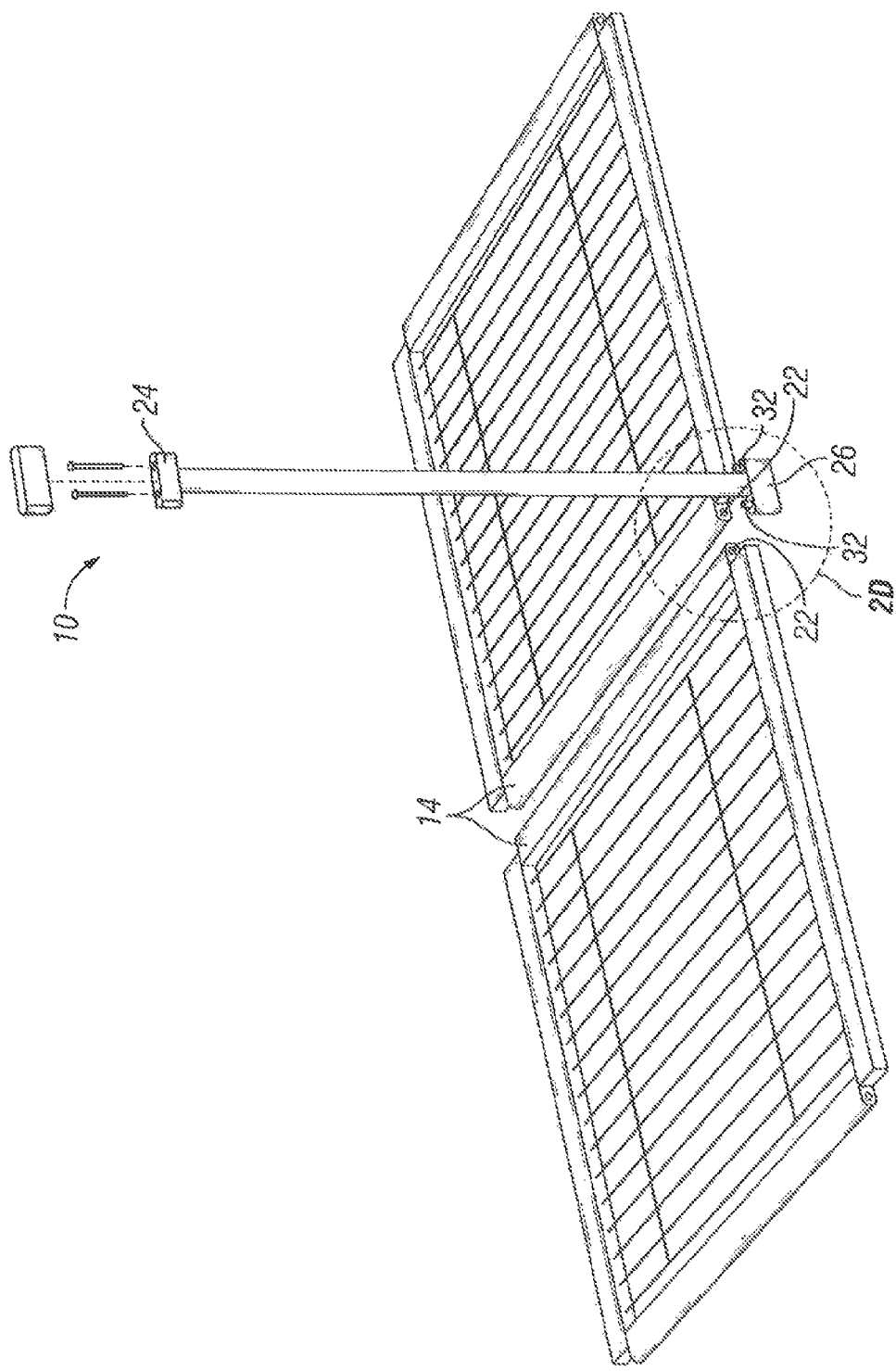

CONVERTIBLE PET BARRIER WITH A CONNECTION MEMBER

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE DISCLOSURE

This disclosure relates to a convertible pet barrier for restricting the movement of a pet. More specifically, this disclosure relates to a connection member for a convertible pet barrier.

BACKGROUND OF THE DISCLOSURE

Sometimes owners of pets will use pet barriers to prevent their pets from having the run of the house. For example, an owner may use a pet pen to enclose an animal or a pet gate to keep an animal in a certain area of a home, for example. If an owner wants pet barriers with both of the above functions, they often have to buy two different barriers, which may result in a greater expense to the consumer and require more storage space.

SUMMARY OF THE DISCLOSURE

In an embodiment of the disclosure, a pet barrier connection member is disclosed. The pet barrier connection member comprises a first end configured to couple to a top surface of a first panel and a top surface of a second panel, a second end configured to couple to a bottom surface of the first panel and a bottom surface of the second panel, and a rod coupled to the first end and the second end.

In another embodiment of the disclosure, a pet barrier is disclosed. The pet barrier comprises a first panel that comprises a top surface and a bottom surface, a second panel that comprises a top surface and a bottom surface, and a connection member configured to couple the first panel to the second panel. The connection member comprises a first end configured to couple to the top surface of the first panel and the top surface of the second panel, a second end configured to couple to the bottom surface of the first panel and the bottom surface of the second panel, and a rod configured to couple to the first end and the second end.

In yet another embodiment, a pet barrier is disclosed. The pet barrier comprises a first panel that comprises a first hole on a recessed top surface and a second hole on a recessed bottom surface, a second panel that comprises a first hole on a recessed top surface and a second hole on a recessed bottom surface, and a connection member configured to couple the first panel to the second panel. The connection member comprises a first end that comprises two holes. The first end is configured to couple to the recessed top surface of the first panel and the recessed top surface of the second panel using a plurality of pins. The connection member also comprises a second end that comprises two dowels. The second end is configured to couple to the recessed bottom surface of the first panel and the recessed bottom surface of the second panel. The connection member further comprises a rod configured to couple to the first end and the second end.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 2c is another exploded view of an embodiment of a convertible pet barrier with a connection member.

DETAILED DESCRIPTION OF THE PREFERRED EMBODIMENTS

The disclosure provides a convertible pet barrier with a connection member that may be used to restrict the movement of pets. In an embodiment, the convertible pet barrier has a plurality of functions. For example, the convertible pet barrier may convert between a freestanding room divider, a freestanding gate, and a pen. A single pet barrier with multiple functions like the convertible pet barrier disclosed herein may be more economical for a consumer.

The disclosure also provides a connection member for the convertible pet barrier. In an embodiment, the convertible pet barrier may comprise a connection member between each panel. The connection member disclosed herein may enable greater ease in assembly, disassembly, and conversion of the convertible pet barrier by allowing two degrees of freedom. Further, the connection member disclosed herein may help to increase the stability of the convertible pet barrier. For example, the connection member disclosed herein provides distributed points of contact between panels. The distributed points of contact may be located at points within the panels such as on recessed tops and recessed bottoms of the panels thereby affording the convertible pet barrier greater strength. In an embodiment, the connection member disclosed herein comprises holes, pins, and dowels. It may seem counterintuitive, but such an embodiment actually produces a sturdy connection between the panels by, for example, leveraging gravity.

Figure 1A:
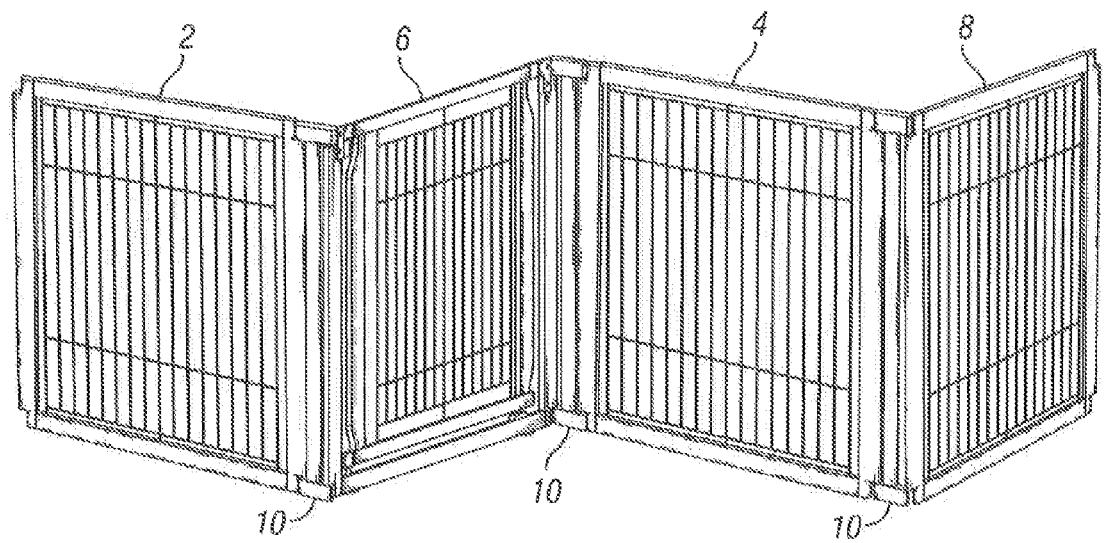
FIG. 1a is a perspective view of an embodiment of a convertible pet barrier with a connection member.
Figure 1B:
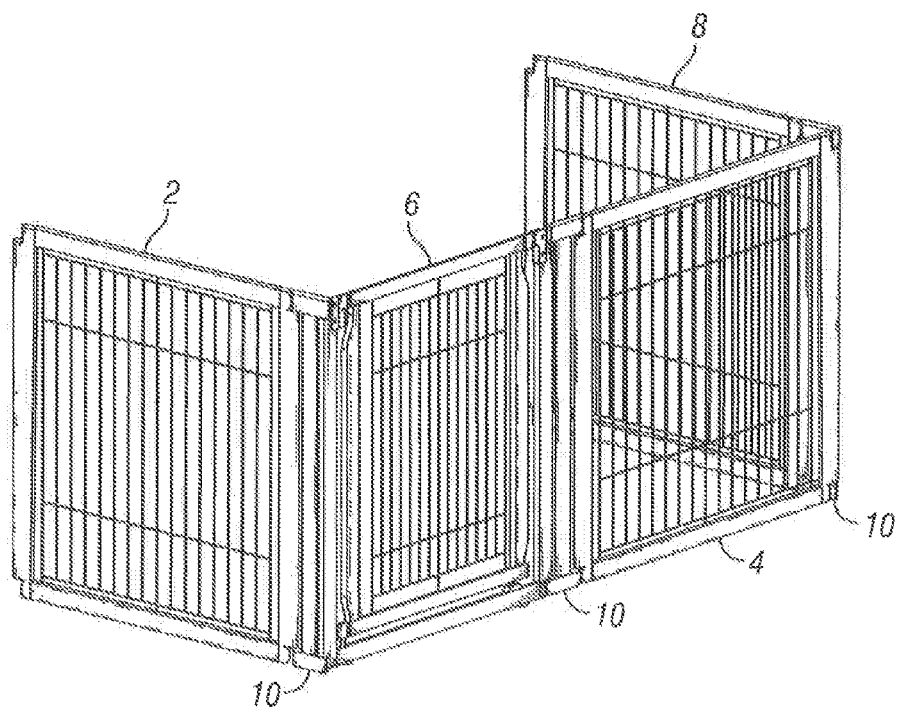
FIG. 1b is a perspective view of another embodiment of a convertible pet barrier with a connection member.
Figure 1C:
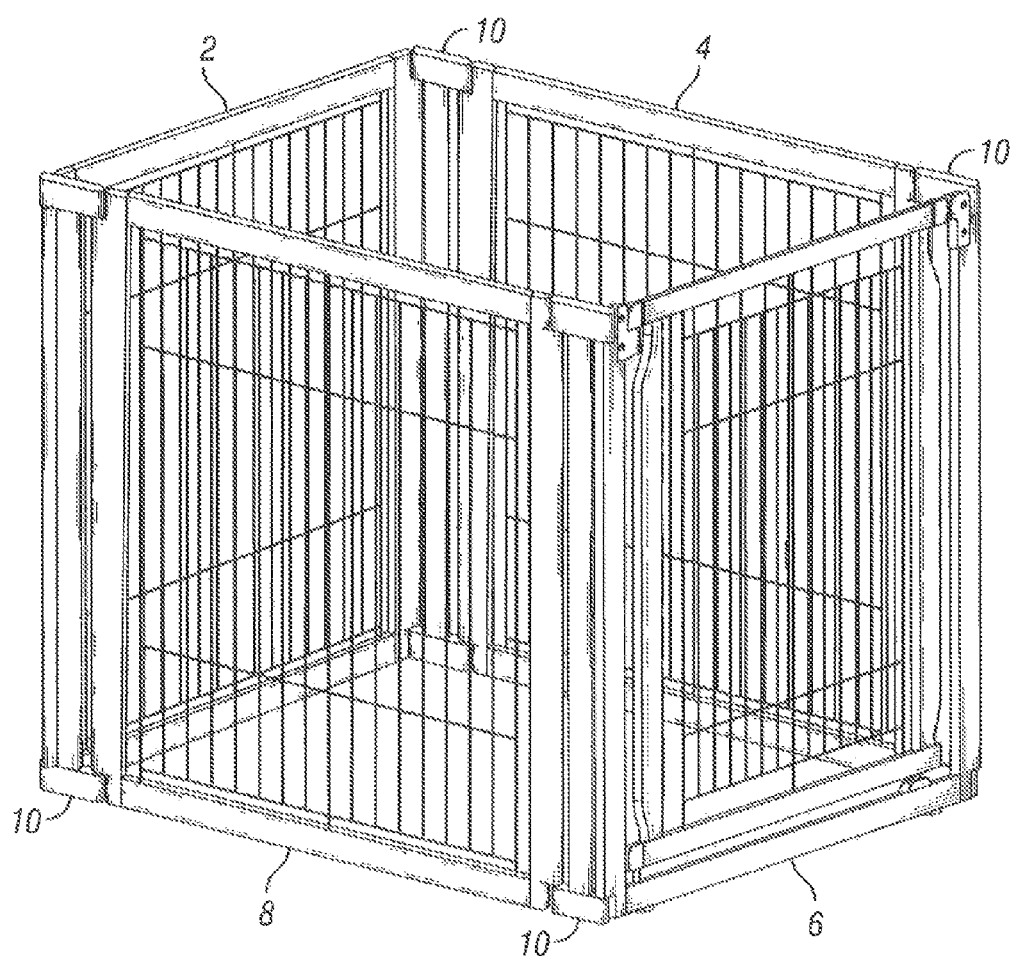
FIG. 1c is a perspective view of yet another embodiment of a convertible pet barrier with a connection member.

FIGS. 1a-1c illustrate different embodiments of a convertible pet barrier with a connection member. Specifically, the pet barrier illustrated in FIGS. 1a-1c is "convertible" because it may be easily converted into a freestanding room divider as illustrated in FIG. 1a, a freestanding gate as illustrated in FIG. 1b, or a pen as illustrated in FIG. 1c. Each of the embodiments of the convertible pet barrier illustrated in FIGS. 1a-1c comprises a plurality of panels 2, 4, 6, and 8 and a connection member 10 between each of the plurality of panels 2, 4, 6, and 8. Panels 2, 4, 6, and 8 and connection member 10 will be described in greater detail below with regard to FIGS. 2a and 2b. In an embodiment, one of the plurality of panels, such as panel 6, is a door panel. An embodiment of a door panel will be described in greater detail below with regard to FIGS. 3a and 3b. While four panels 2, 4, 6, and 8 are illustrated in FIGS. 1a-1c, one of ordinary skill in the art will appreciate that the convertible pet barrier may comprise a greater number of panels or a lesser number of panels without departing from the scope of the disclosure.

FIG. 1a illustrates an embodiment of a convertible pet barrier with a connection member. Particularly, as stated above, FIG. 1a illustrates a convertible pet barrier as a freestanding room divider. In such an embodiment, the plurality of panels 2, 4, 6, and 8 are open and are non-self-enclosing. While each of the plurality of panels 2, 4, 6, and 8 are illustrated in FIG. 1a at approximately ninety degree angles from each other, one of ordinary skill in the art will appreciate that the angles between each of the plurality of panels 2, 4, 6, and 8 may be greater or less than approximately ninety degrees. Further, the angles between some of the plurality of panels 2, 4, 6, and 8 may be different.

FIG. 1b illustrates another embodiment of a convertible pet barrier with a connection member. Specifically, as stated above, FIG. 1b illustrates a convertible pet barrier as a freestanding gate. In such an embodiment, the plurality of panels 2, 4, 6, and 8 are open and non-self-enclosing and define an open space. As illustrated in FIG. 1b, the plurality of panels 2, 4, 6, and 8 of the freestanding gate may be positioned relative to each other so as to resemble a letter "U". Alternatively, the plurality of panels 2, 4, 6, and 8 of the convertible pet barrier illustrated in FIG. 1b may be moved alone or in combination with additional panels in such a way so as to resemble a different letter, such as a "C", a "V", an "L", or any other letter, or a shape, such as a triangle, a rectangle, a pentagon, a hexagon, a heptagon, an octagon, or any other shape.

FIG. 1c illustrates yet another embodiment of a convertible pet barrier with a connection member. In particular, as stated above, FIG. 1c illustrates a convertible pet barrier as a pen. In such an embodiment, the plurality of panels 2, 4, 6, and 8 are self-enclosing, which means that the end panels couple together to form a closed loop. As illustrated in FIG. 1c, the plurality of panels 2, 4, 6, and 8 form a rectangular pen. Alternatively, the plurality of panels 2, 4, 6, and 8 may be moved alone or in combination with additional panels in such a way so as to form a pen in the shape of a triangle, a pentagon, a hexagon, a heptagon, an octagon, or any other shape.

In an embodiment, the convertible pet barrier illustrated in FIG. 1c may comprise one or more top panels. Depending on the size of the pen, the convertible pet barrier illustrated in FIG. 1c may comprise a single top panel, a plurality of top panels, or an expandable top panel. An embodiment of a top panel will be described in greater detail below with regard to FIGS. 4a-4c. The convertible pet barrier illustrated in FIG. 1c may also comprise a floor tray.

Figure 2A:
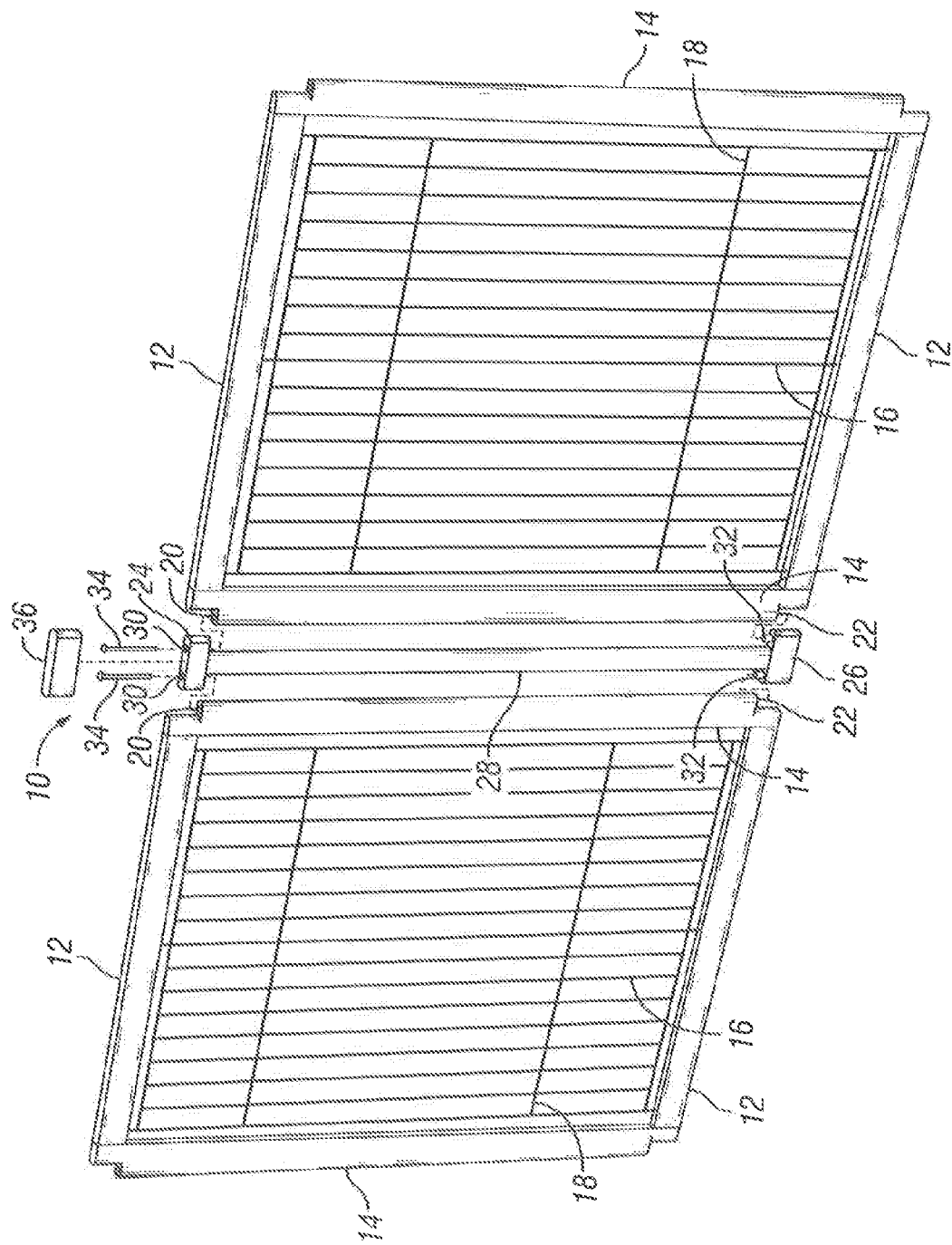
FIG. 2a is an exploded perspective view of an embodiment of a convertible pet barrier with a connection member.
Figure 2B:
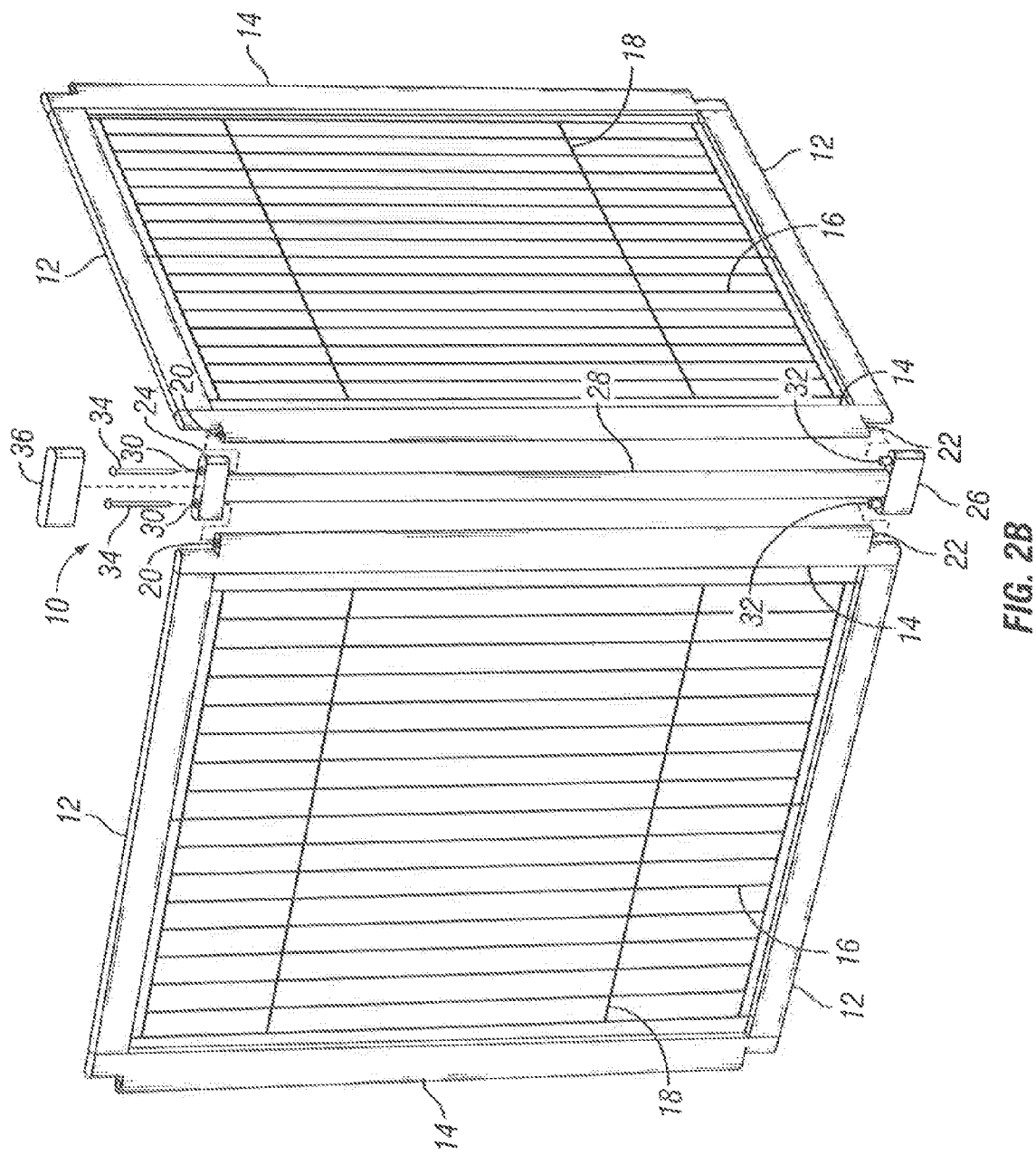
FIG. 2b is an exploded perspective view of another embodiment of a convertible pet barrier with a connect member.

Turning now to FIGS. 2a and 2b, an exploded view of embodiments of a convertible pet barrier with a connection member are illustrated. More specifically, FIGS. 2a and 2b illustrate an exploded view of two panels of the plurality of panels 2, 4, 6, and 8 and the connection member 10 there between. In an embodiment, the connection member 10 is configured to couple one of the plurality of panels 2, 4, 6, and 8 to another of the plurality of panels 2, 4, 6, and 8. Coupled as used herein means directly or indirectly connected.

Each of the plurality of panels 2, 4, 6, and 8 may comprise two horizontal frame members 12 and two vertical frame members 14. The horizontal and vertical frame members 12 and 14 may be made out of wood, plastic, metal, or any combination thereof. In an embodiment, each of the plurality of panels 2, 4, 6, and 8 also comprise a plurality of vertical members 16 and a plurality of horizontal members 18. The vertical and horizontal members 16 and 18 may be wires. Alternatively, the vertical and horizontal members 16 and 18 may be wooden bars or plastic bars. In any embodiment, the vertical and horizontal members 16 and 18 may be generally cylindrical or generally planar. In addition to or in place of the vertical and horizontal members 16 and 18, a plastic panel or cloth may be used.

Each side of the horizontal frame members 12 may be recessed, the top and the bottom of the vertical frame members 14 may be recessed, or both the sides of the horizontal frame members 12 and the top and the bottom of the vertical frame members 14 may be recessed. For example, as is illustrated in FIGS. 2a and 2b, the top and the bottom of each of the vertical frame members 14 may be recessed. The amount of the recession of the top and the bottom of each of the vertical frame members 14 in terms of height may be such that when the convertible pet barrier is assembled, the connection member 10 does not protrude beyond the vertical frame members 14 and/or the horizontal frame members 12. In a preferred embodiment, the amount of the recession of the top and the bottom of each of the vertical frame members 14 in terms of height is such that when the convertible pet barrier is assembled, there is some amount of space between the top and bottom of the connection member 10 and the top and bottom of the vertical frame members 14 and/or the horizontal frame members 12. Such an embodiment may enable easier assembly and conversion of the convertible pet barrier by allowing the connection members 10 to be more easily coupled and uncoupled from any two of the plurality of panels 2, 4, 6, and 8.

In terms of length, the amount of the recession of the top and the bottom of each of the vertical frame members 14 may be such that when the convertible pet barrier is assembled, the connection member 10 sits approximately flush with the vertical frame members 14. In a preferred embodiment, the amount of recession of the top and the bottom of each of the vertical frame members 14 in terms of length is such that when the convertible pet barrier is assembled, there is some amount of space between the connection member 10 and the vertical frame members 14. Such an embodiment may enable easier movement and/or rotation of any two of the plurality of panels 2, 4, 6, 8 about the connection member 10. Additionally, such an embodiment enables a cap, for example, cap 36 in FIGS. 2a and 2b, which will be discussed in greater detail below, to fit securely atop the connection member 10.

In an embodiment, the bottom horizontal frame member 12 of each of the plurality of panels 2, 4, 6, and 8 may comprise one or more stoppers (not shown) on the bottom side. For example, the bottom side of the bottom horizontal frame member 12 of each of the plurality of panels 2, 4, 6, and 8 may comprise two rubber or plastic stoppers. The one or more stoppers may prevent the plurality of panels 2, 4, 6, and 8 from sliding on a flooring surface. Additionally, the one or more stoppers may prevent the scratching of the flooring surface upon which the convertible pet barrier is placed.

As stated above, the connection member 10 may be configured to couple one of the plurality of panels 2, 4, 6, and 8 to another of the plurality of panels 2, 4, 6, and 8. More specifically, the connection member 10 may be configured to couple to a top surface and a bottom surface of one of the vertical frame members 14 of one of the plurality of panels 2, 4, 6, and 8 and one of the vertical frame members 14 of another of the plurality of panels 2, 4, 6, and 8. In an embodiment, the top surface and the bottom surface of each of the vertical frame members 14 is located on the recessed top and the recessed bottom of each of the vertical frame members 14 described above, respectively. The recessed top and the recessed bottom of each of the vertical frame members 14 may comprise holes 20 and 22, respectively, to enable the coupling of the connection member 10 to two of the plurality of panels 2, 4, 6, and 8.

Turning now to the connection member 10, in an embodiment, the connection member 10 comprises a first end 24, a second end 26, and a rod 28. The rod 28 may be coupled to or configured to couple the first end 24 to the second end 26. In an embodiment, each of the first end 24, the second end 26, and the rod 28 is be made out of wood, plastic, metal, or any combination thereof. As illustrated in FIGS. 2a and 2b, the connection member 10, and more specifically, the first end 24, the second end 26, and the rod 28 may form an I-shape.

Figure 2D:
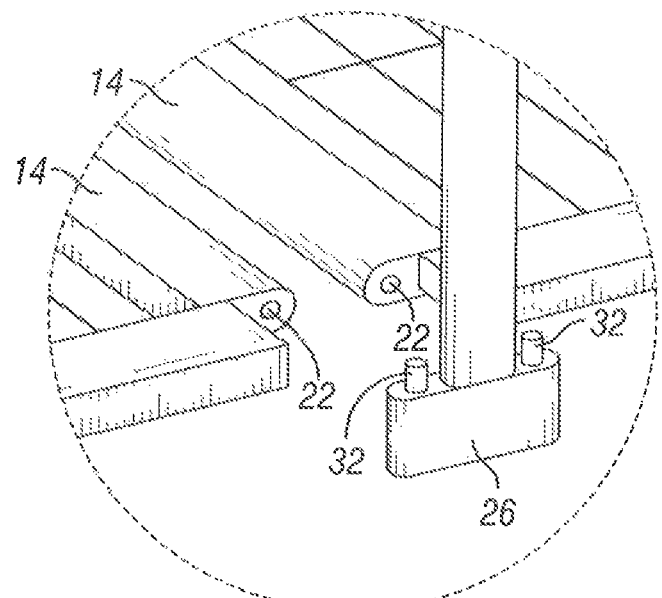
FIG. 2d is yet another exploded view of an embodiment of a convertible pet barrier with a connection member.
Figure 2E:
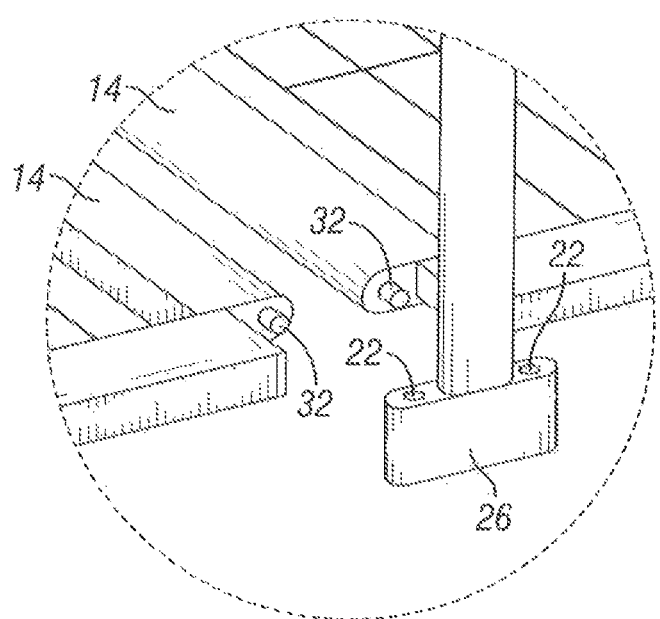
FIG. 2e is still another exploded view of an embodiment of a convertible pet barrier with a connection member.

The first end 24 may comprise holes 30 and the second end 26 may comprise dowels 32. In an embodiment, in order to couple one of the plurality of panels 2, 4, 6, and 8 to another of the plurality of panels 2, 4, 6, and 8, the dowels 32 of the second end 26 of the connection member 10 are inserted into the holes 22 (as shown in FIGS. 2c and 2d) of the recessed bottoms of the vertical frame members 14. In an alternate embodiment, the holes 22 and dowels 32 may be reversed such that the second end 26 comprises holes 22 and the recessed bottoms of the vertical frame members 14 comprise dowels 32 (e.g., as shown in FIG. 2e). In such an embodiment, in order to couple one of the plurality of panels 2, 4, 6, and 8 to another of the plurality of panels 2, 4, 6, and 8, the holes 22 of the second end 26 of the connection member 10 would be positioned such that the dowels 32 of the recessed bottoms of the vertical frame members 14 are inserted into the holes 22.

Next, the holes 30 of the first end 24 of the connect member 10 may be aligned with the holes 20 of the recessed tops of the vertical frame members 14 and pins 34 may be inserted into both holes 30 and 20. Hole as used herein covers both a hole that passes completely through to the other side (e.g., hole 30) and a hole that is merely a recess and does not pass completely through to the other side (e.g., holes 20 and 22). Contrary to what one might think since the connection member 10 may use dowels and pins as opposed to a threaded or more permanent connection, the connection member 10 produces a sturdy connection between the plurality of panels 2, 4, 6, and 8 by leveraging gravity.

Additionally, coupling two of the plurality of panels 2, 4, 6, and 8 to the connection member 10 through the use of pins 34 and dowels 32 as described above enables easier assembly and/or disassembly of the convertible pet barrier as well easier conversion of the convertible pet barrier. For example, the connection member 10 described above enables the two coupled panels 2, 4, 6, or 8 to be freely and easily rotated in either direction about the connection member 10. Stated differently, the connection member 10 enables two degrees of freedom as opposed to a hinge, which merely enables a single degree of freedom. In alternative embodiments, instead of using pins 34 and dowels 32, the connection member 10 may be coupled to two of the plurality of panels 2, 4, 6, and 8 in a more permanent way such as by way of screws.

The connection member 10 provides distributed points of contact between the connection member 10 and the two coupled panels 2, 4, 6, or 8 (e.g., holes 20 and holes 30 with pins 34, holes 22 and dowels 32, etc.), which affords the convertible pet barrier greater strength and stability. For example, referring to FIGS. 2a and 2b, the connection points between the connection member 10 and the two coupled panels 2, 4, 6, or 8 may be distributed to points within the two coupled panels 2, 4, 6, or 8 rather than just to the surface of the two coupled panels 2, 4, 6, or 8. Further, referring again to FIGS. 2a and 2b, the connection member 10 may be configured to couple to a top and a bottom surface of two of the plurality of panels 2, 4, 6, and 8 rather than to just a side surface, which also helps to increase the steadiness of the convertible pet barrier. Additionally, the connection member 10 and more specifically, the distributed points of contact enabled by the connection member 10 help to reduce the likelihood that a user's hand will be caught and pinched when the convertible pet gate folded.

In an embodiment, the connection member 10 also comprises a cap 36. The cap 36 may be made of plastic, wood, metal, or any combination thereof. In an embodiment, the cap 36 is of a shape such that it fits securely over the first end 24. For example, the cap 36 may be a rectangular shape. Placing the cap 36 atop the first end 24 may restrict the movement of or secure the position of each of the two coupled panels 2, 4, 6, or 8. In an embodiment, the cap 36 secures one of the coupled panels 2, 4, 6, and 8 at approximately a one hundred and eighty degree angle from another of the coupled panels 2, 4, 6, and 8. FIG. 2a illustrates such an embodiment. In another embodiment, the cap 36 secures one of the coupled panels 2, 4, 6, and 8 at approximately a ninety degree angle from another of the coupled panels 2, 4, 6, and 8. FIG. 2b illustrates such an embodiment. The use of the cap 36 over the first end 24 may help to further improve the stability of the convertible pet gate by fixing panels 2, 4, 6, and/or 8 at or restricting movement from an angle (e.g., approximately ninety degrees or approximately one hundred and eighty degrees) that promotes steadiness. Additionally, the cap 36 may help prevent pets from removing and/or swallowing the pins 34. If an angle other than either approximately ninety degrees or approximately one hundred and eighty degrees is desired between any of the panels 2, 4, 6, or 8, the cap 36 may not be used. Alternatively, alternate caps may fix the panels 2, 4, 6, and 8 at different angles to each other.

Figure 3A:
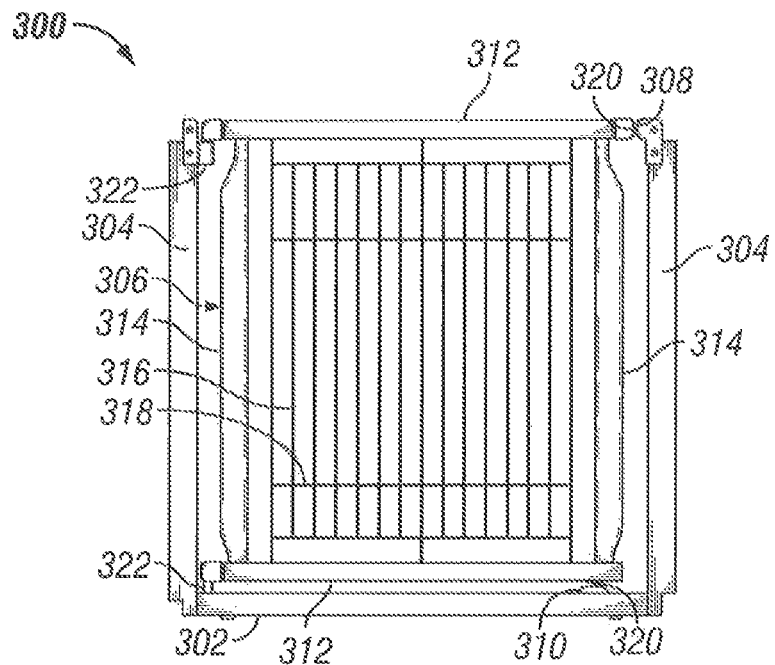
FIG. 3a is a front view of one embodiment of a door panel illustrating the door panel in a closed state.
Figure 3B:
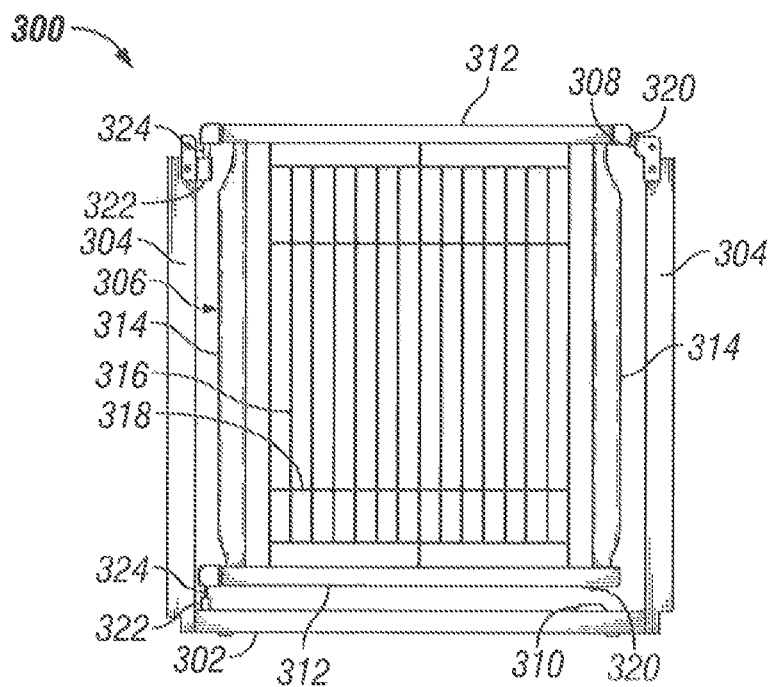
FIG. 3b is a front view of one embodiment of a door panel illustrating the door panel in a lifted state.

As mentioned above, one of the plurality of panels 2, 4, 6, and 8 may be a door panel. FIGS. 3a and 3b illustrate an embodiment of a door panel 300. The door panel 300 may comprise a horizontal door panel frame member 302, a plurality of vertical door panel frame members 304, and a door 306. The horizontal door panel frame member 302 and the vertical door panel frame members 304 may be made out of wood, plastic, metal, or any combination thereof. In an embodiment, a portion of the top and the bottom of each of the vertical door panel frame members 304 are recessed and each of the recessed surfaces comprises a hole (not shown) similar to what was described above with respect to FIGS. 2a and 2b to enable the door panel 300 to be coupled to another panel, such as one plurality of panels 2, 4, 6, or 8, via a connection member, such as connection member 10.

In an embodiment, a portion 308 of one of the vertical door panel frame members 304 is inset. Specifically, the inset portion 308 is on the vertical door panel frame member 304 farthest from the axis upon which the door 306 rotates. Also, a portion 310 of the horizontal door panel frame member 302 may be inset. As will be discussed in more detail below, in an embodiment, both inset portions 308 and 310 help to keep the door 306 in the closed position by maintaining a portion of the door 306 (e.g., retractable pegs 320).

The door 306 may comprise a plurality of horizontal door frame members 312 and a plurality of vertical door frame members 314. The horizontal door frame members 312 and the vertical door frame members 314 may be made out of wood, plastic, metal, or any combination thereof. In an embodiment, the door 306 comprises a plurality of vertical door members 316 and a plurality of horizontal door members 318. The vertical and horizontal door members 316 and 318 may be wires. Alternatively, the vertical and horizontal door members 316 and 318 may be wooden bars or plastic bars. In any embodiment, the vertical and horizontal door members 316 and 318 may be generally cylindrical or generally planar.

In an embodiment, the door 306 comprises a plurality of retractable pegs 320. For example, as is illustrated in FIGS. 3a and 3b, the door 306 may comprise two retractable pegs 320. One of the retractable pegs 320 may be coupled to an end of one of the horizontal door frame members 312. Specifically, one of the retractable pegs 320 may be coupled to the end of the top horizontal door frame member 312 farthest from the axis upon which the door 306 rotates. In an embodiment, the other of the retractable pegs 320 is coupled to a bottom of one of the horizontal door frame members 312. In particular, the other of the retractable pegs 320 may be coupled to the bottom of the bottom horizontal door frame member 312. The retractable pegs 320 may be positioned such that when the door is in the closed position one of the retractable pegs 320 is contained within the inset portion 308 and the other of the retractable pegs 320 is contained within the inset portion 310. In an embodiment, the retractable pegs 320 are made from plastic, wood, metal, or any combination thereof.

The door 306 may be coupled to the horizontal door panel frame member 302 and one of the vertical door panel members 304 by a plurality of connectors 322. For example, the bottom horizontal door frame member 312 may be coupled to the horizontal door panel member 302 by one of the plurality of connectors 322 and one of the vertical door frame members 314 may be coupled to one of the vertical door panel members 304 by another one of the plurality of connectors 322. In an embodiment, the plurality of connectors 322 are screws, pins, or another type of connector. The plurality of connectors 322 may be of a length that enables a play allowance 324. This play allowance 324 is illustrated in FIG. 3b, which shows the door 306 in a lifted position. In an embodiment, the play allowance 324 enables the door 306 to be raised so that the retractable pegs 320 can be removed from the inset portions 308 and 310 and the door 306 can be opened.

Figure 4A:
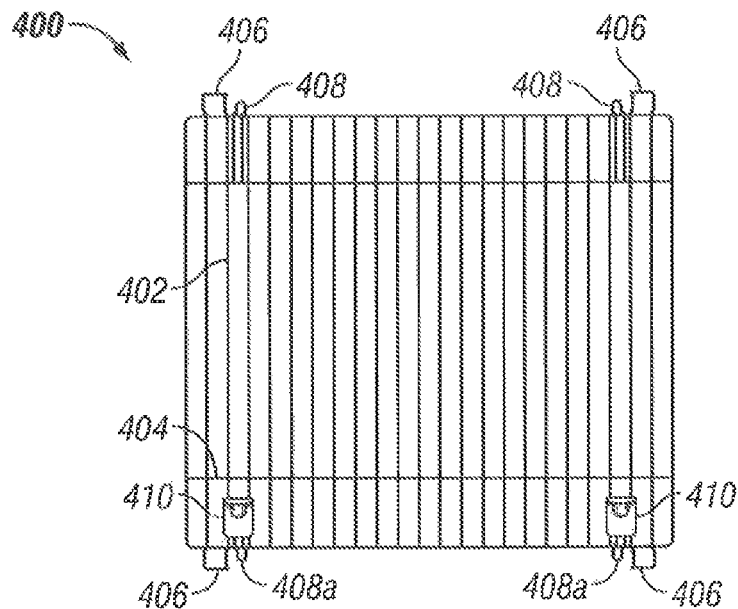
FIG. 4a is a top view of one embodiment of a top panel illustrating retractable stoppers in an extended state.
Figure 4B:
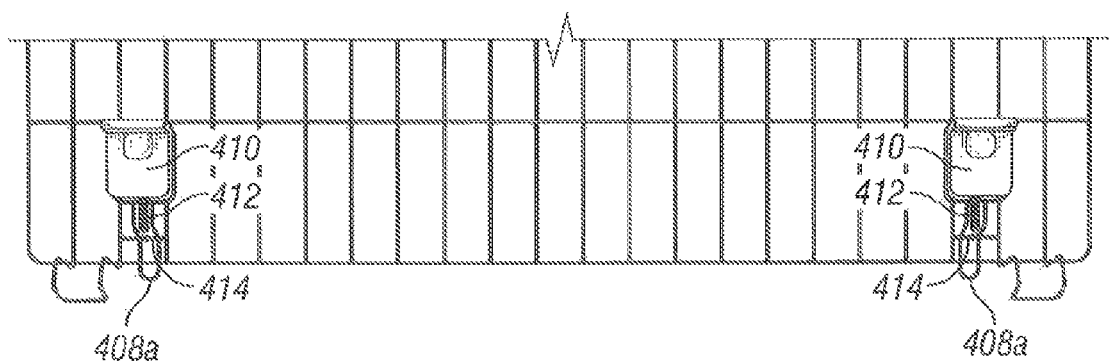
FIG. 4b is a top view of one embodiment of a top panel illustrating retractable stoppers in a refracted state.
Figure 4C:
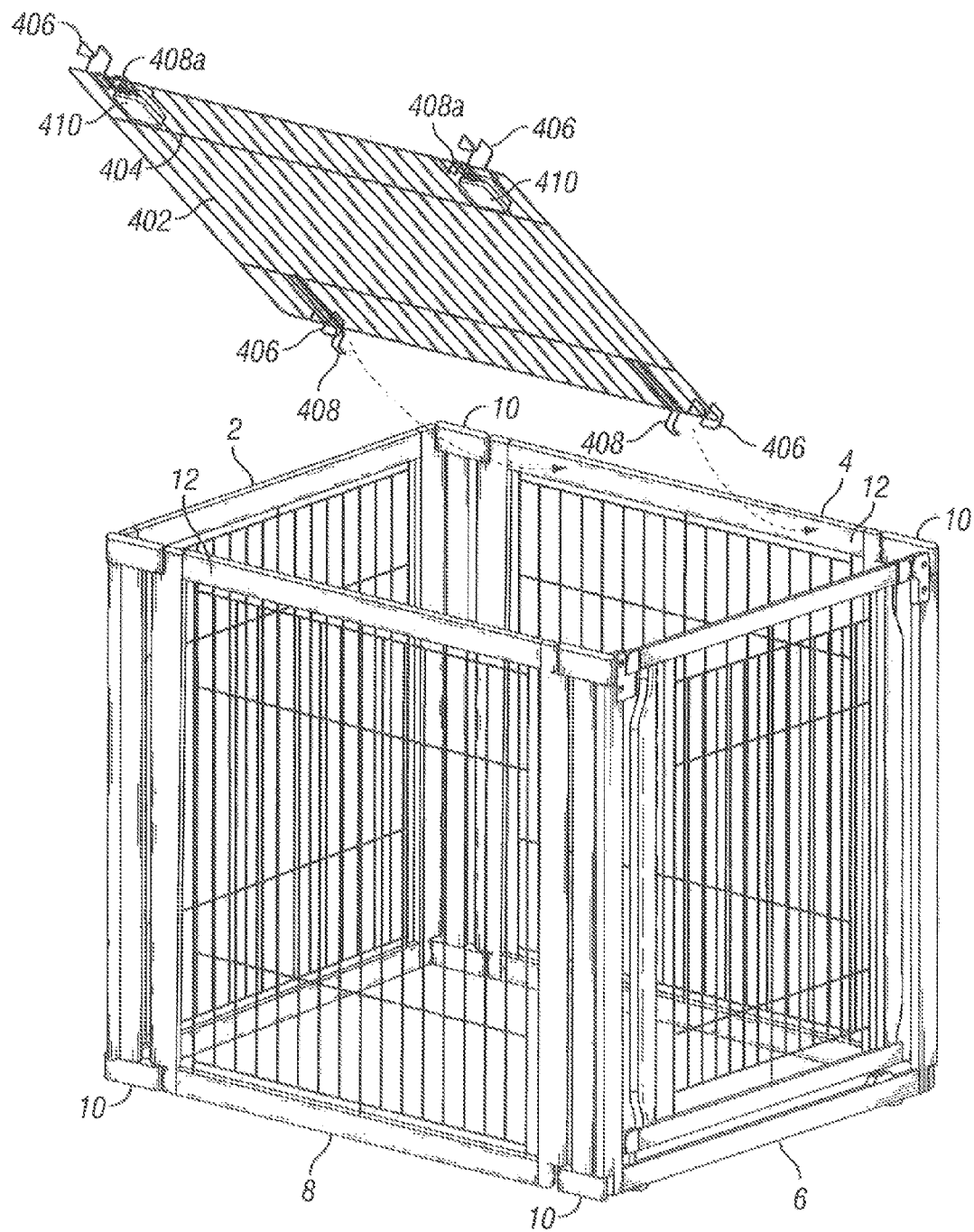
FIG. 4c is a perspective view of one embodiment of a top panel being placed atop a convertible pet barrier with a connection member.

As mentioned above, when the convertible pet barrier is assembled into a pen as illustrated in FIG. 1c, the pen may comprise one or more top panels. FIGS. 4a-4c illustrate an embodiment of a top panel 400. The top panel 400 illustrated in FIGS. 4a-4c is rectangular in shape. Such a top panel 400 may fit atop a rectangular shaped pen. In alternative embodiments, the top panel 400 may be a different shape. For example, if the convertible pet barrier is assembled into an octagonal shaped pen, the top panel 400 may be octagonal shaped as well.

The top panel 400 may comprise a plurality of top panel members 402 and 404. In an embodiment, the plurality of top panel members 402 and 404 are generally perpendicular to each other. The top panel members 402 and 404 may be wires. Alternatively, the top panel members 402 and 404 may be wooden bars or plastic bars. In any embodiment, the top panel members 402 and 404 may be generally cylindrical or generally planar.

Additionally, the top panel 400 may comprise a plurality of hooks 406 and a plurality of stoppers 408. Specifically, the top panel 400 may comprise four hooks 406 and four stoppers 408. In an embodiment, two of the plurality of hooks 406 and two of the plurality of stoppers 408 are on one side of the top panel 400 and the other two of the plurality of hooks 406 and the other two of the plurality of stoppers 408 are on the opposite side of the top panel 400. The plurality of hooks 406 may be shaped such that they fit over the top of one of the horizontal frame members 12 of one of the plurality of panels 2, 4, 6, and 8. In an embodiment, the plurality of stoppers 408 are shaped such that they fit under the bottom of one of the horizontal frame members 12 of one of the plurality of panels 2, 4, 6, and 8. The plurality of hooks 406 and the plurality of stoppers 408 may be made out of metal, plastic, wood, or any combination thereof.

Some of the plurality of stoppers 408 may be retractable. The retractable stoppers are illustrated in FIGS. 4a-4c by numeral 408a. In an embodiment, the retractable stoppers 408a are located on the same side of the top panel 400. The retractable stoppers 408a may be retractable via the use of handles 410 coupled to the retractable stoppers 408a and springs 412. The handles 410 may be coupled to two of the plurality of top panel members 402 such that the handles 410 are able to slide forward and backward along the two of the plurality of top panel members 402. In an embodiment, one side of each of the handles 410 is raised thereby creating a grip. Such a grip may enable a user to more easily move the handles 410 and retract the retractable stoppers 408a.

The springs 412 are illustrated in FIG. 4b, which shows the top panel 400 in a retracted state. In an embodiment, the springs 412 are coil springs. In an alternate embodiment, the springs 412 are some other member providing an elastic response as understood by those of ordinary skill in the art. One end of each of the springs 412 may be coupled to one of the handles 410 and the other end of each of the springs 412 may be coupled to one of the horizontal members 414. The springs 412 may cause the handles 410 to be pulled in the direction of the horizontal members 414 and the retractable stoppers 408a to be in the non-refracted state.

FIG. 4c illustrates the top panel 400 being placed atop the convertible pet barrier when the convertible pet barrier is assembled into a pen. In an embodiment, in order to place the top panel 400 on top of the pen, the plurality of hooks 406 and the plurality of stoppers 408 on the side of the top panel 400 opposite the retractable stoppers 408a are placed around one of the horizontal frame members 12 of one of the plurality of panels 2, 4, 6, and 8. Next, the handles 410 may be pulled back thereby retracting the retractable stoppers 408a and the remaining plurality of hooks 406 may be placed around one of the horizontal frame members 12 of another of the plurality of panels 2, 4, 6, and 8. Once the remaining plurality of hooks 406 are placed atop the pen, the handles 410 may be released thereby causing the retractable stoppers 408a to revert into the non-retracted state. In an embodiment, the plurality of stoppers 408 help to prevent the top panel 400 from being removed from the pen.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A pet barrier comprising:
a first panel that comprises a first top surface having a first top recess, a first bottom surface having a first bottom recess, a first hole disposed in the first top recess, and a second hole disposed in the first bottom recess, wherein the second hole disposed in the first bottom recess is directed downwards;
a second panel that comprises a second top surface having a second top recess, a second bottom surface having a second bottom recess, a third hole disposed in the second top recess, and a fourth hole disposed in the second bottom recess, wherein the second hole disposed in the second bottom recess is directed downwards; and
a connection member configured to couple the first panel to the second panel comprising:
a first end that comprises two holes, the first end configured to couple to the first top recess and the second top recess using a plurality of pins, wherein a first pin of the plurality of pins is configured to pass through a first hole of the two holes from the top and into the first hole disposed in the first top recess, and wherein a second pin of the plurality of pins is configured to pass through a second hole of the two holes from the top and into the third hole disposed in the second top recess;
a second end that comprises two dowels, wherein the two dowels extend upwards from the second end, wherein the second end is configured to couple to the first bottom recess and the second bottom recess, wherein a first dowel of the two dowels is configured to pass upwards from the second end into the second hole disposed in the first bottom recess, and wherein a second dowel of the two dowels is configured to pass upwards from the second end into the fourth hole disposed in the second bottom recess; and
a rod configured to couple to the first end and the second end.

2. The pet barrier of claim 1, wherein the connection member provides distributed points of contact with the first panel and the second panel.

3. The pet barrier of claim 1, further comprising a cap covering the first end, the first pin, and the second pin, wherein the cap is configured to engage and secure the first panel at a selected angle relative to the second panel.

4. The pet barrier of claim 3, wherein the cap is further configured to have a top surface that is approximately flush with the first top surface of the first panel and the second top surface of the second panel.

* * * * *